US 8,613,592 B2

(12) United States Patent
Elorza Gomez

(10) Patent No.: US 8,613,592 B2
(45) Date of Patent: Dec. 24, 2013

(54) GUIDE BLADE OF A TURBOMACHINE

(75) Inventor: Sergio Elorza Gomez, Munich (DE)

(73) Assignee: MTU Aero Engines GmbH, Munich (DE)

( * ) Notice: Subject to any disclaimer, the term of this patent is extended or adjusted under 35 U.S.C. 154(b) by 0 days.

(21) Appl. No.: 13/640,220

(22) PCT Filed: Apr. 7, 2011

(86) PCT No.: PCT/DE2011/000375
§ 371 (c)(1),
(2), (4) Date: Oct. 9, 2012

(87) PCT Pub. No.: WO2011/124214
PCT Pub. Date: Oct. 13, 2011

(65) Prior Publication Data
US 2013/0028749 A1    Jan. 31, 2013

(30) Foreign Application Priority Data
Apr. 10, 2010  (DE) .................. 10 2010 014 556

(51) Int. Cl.
*F04D 29/38*  (2006.01)
*F01D 9/02*  (2006.01)
(52) U.S. Cl.
USPC .............. 415/208.2; 415/208.1; 415/211.2; 416/242; 416/243
(58) Field of Classification Search
USPC ......... 415/191, 208.1, 208.2, 211.2; 416/242, 416/243
See application file for complete search history.

(56) References Cited

U.S. PATENT DOCUMENTS

| 6,195,983 | B1 | 3/2001 | Wadia et al. |
| 6,755,612 | B2 * | 6/2004 | Shahpar et al. ............... 415/192 |
| 2003/0215325 | A1 | 11/2003 | Tsuchiya et al. |
| 2004/0091353 | A1 | 5/2004 | Shahpar et al. |
| 2006/0222488 | A1 | 10/2006 | Fessou et al. |
| 2009/0123276 | A1 | 5/2009 | Greim et al. |
| 2009/0238682 | A1 | 9/2009 | Clemen |

FOREIGN PATENT DOCUMENTS

| DE | 60 2004 001 531 | 7/2007 |
| DE | 10 2008 055824 | 5/2009 |
| EP | 2103783 | 9/2009 |

* cited by examiner

*Primary Examiner* — Edward Look
*Assistant Examiner* — Jesse Prager
(74) *Attorney, Agent, or Firm* — Davidson, Davidson & Kappel, LLC

(57) ABSTRACT

A guide blade of a turbomachine, in particular of a compressor, a blade of the guide blade without an inner shroud having a flow inlet edge, a flow outlet edge, a suction side, and a pressure side. The blade is formed by a plurality of blade sections stacked one on top of the other in the radial direction, and the centers of gravity of the blade sections extend along a stacking axis. The blade sections are stacked one on top of the other in the radial direction in such a way that, in a radially inner section of the blade adjacent to a radially outer section of the blade, the stacking axis has its single inflection point in its radial curvature, namely, between a first, radially inner subsection of the radially inner section in which the stacking axis has a concave curvature toward the pressure side, and a second, radially outer subsection of the radially inner section in which the stacking axis has a concave curvature toward the suction side.

4 Claims, 1 Drawing Sheet

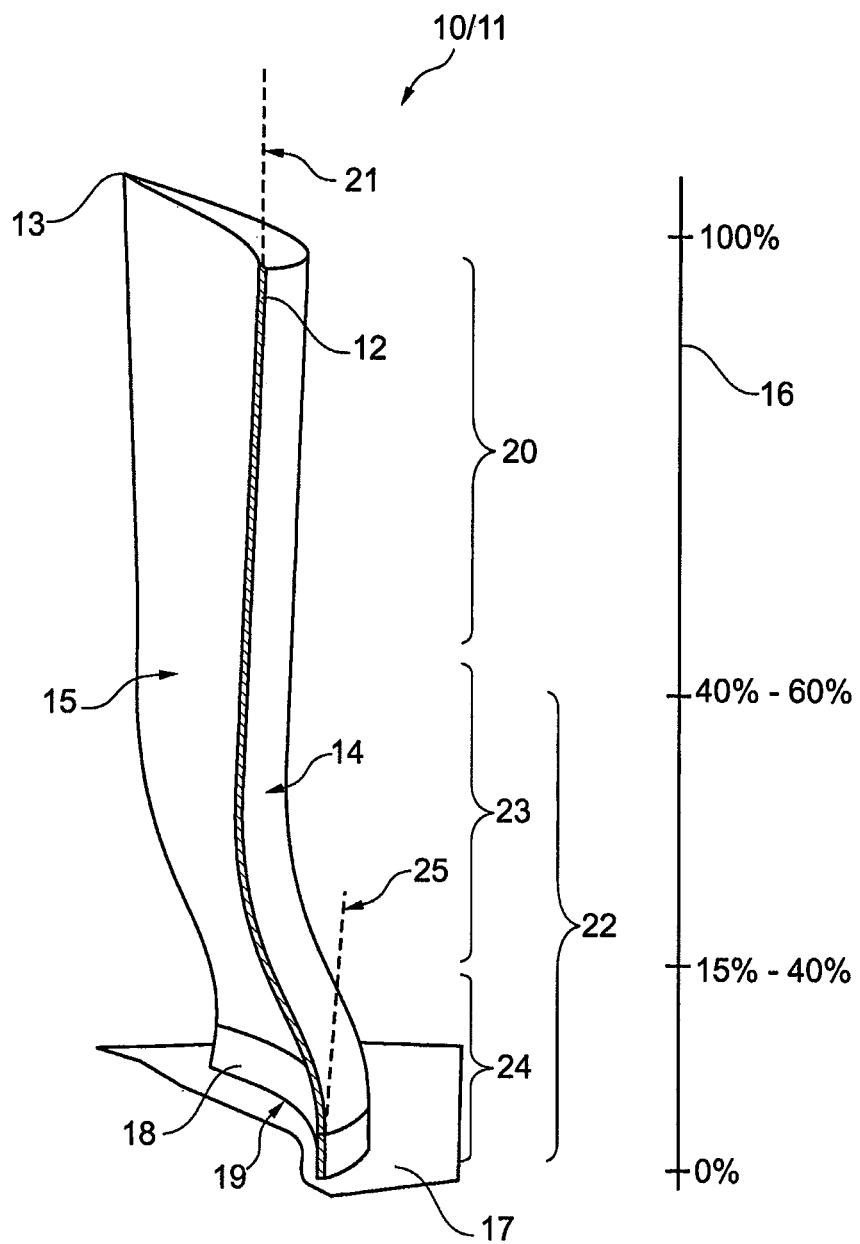

GUIDE BLADE OF A TURBOMACHINE

The present invention relates to a guide blade of a turbomachine.

BACKGROUND

A turbomachine, for example a compressor of a gas turbine, has a stator and a rotor. The stator includes a housing as well as guide blades on the stator side. The rotor includes a rotor base body as well as rotor blades which rotate together with the rotor base body.

A stator-side guide blade has a blade, the blade being defined by a flow inlet edge, a flow outlet edge, a suction side, and a pressure side. The blade of a guide blade radially outwardly adjoins the stator-side housing, and is preferably fastened to the stator-side housing via a blade root. An end, i.e., a tip, of a guide blade without an inner shroud radially inwardly adjoins a hub of a rotor base body, a so-called running clearance being formed between the hub of the rotor base body and the radially inwardly situated end of the guide blade without an inner shroud.

Guide blades known in practice are formed or defined by blade sections which are stacked on or above one another, viewed in the radial direction of the guide blade. The centers of gravity of these blade sections extend along a so-called stacking axis; in guide blades known in practice, the stacking axis extends uncurved or continuously curved essentially in the radial direction. For such a guide blade having no associated inner shroud, losses in the proximity of the rotor hub increase greatly with the height of the running clearance, resulting in loss of efficiency of a turbomachine, which is disadvantageous.

SUMMARY OF THE INVENTION

An object of the present invention is to provide a novel guide blade of a turbomachine.

The present invention provides a guide blade of a turbomachine, in particular of a compressor, a blade of the guide blade without an inner shroud having a flow inlet edge, a flow outlet edge, a suction side, and a pressure side, the blade being formed by a plurality of blade sections stacked one on top of the other in the radial direction, the centers of gravity of the blade sections extending along a stacking axis. The blade sections are stacked one on top of the other in the radial direction in such a way that, in a radially inner section of the blade adjacent to a radially outer section of the blade, the stacking axis has its single inflection point in its radial curvature, namely, between a first, radially inner subsection of the radially inner section in which the stacking axis has a concave curvature toward the pressure side, and a second, radially outer subsection of the radially inner section in which the stacking axis has a concave curvature toward the suction side.

With the present invention, a guide blade of a turbomachine having a blade without an inner shroud is proposed for the first time, with the aid of which stator-side losses of a turbomachine may be greatly reduced. A flow adjacent to a rotor hub of the turbomachine may be improved with the aid of the stator-side guide blade according to the present invention, so that the overall efficiency of the turbomachine as a whole may be improved.

In the first, radially inner subsection of the radially inner section, the stacking axis preferably has a concave curvature toward the pressure side of the guide blade.

Due to the curvature in the first, radially inner subsection of the radially inner section, the blade section which directly adjoins the running clearance is relieved of load, so that stator losses may be reduced.

In the second, radially outer subsection of the radially inner section, the stacking axis preferably has a concave curvature toward the suction side of the guide blade.

Due to the curvature in the second, radially outer subsection of the radially inner section, in particular flow lines in the direction of the hub of the adjacent rotor base body are compressed, thus improving the aerodynamics in the proximity of the hub of the rotor base body.

According to one advantageous refinement of the present invention, in the first, radially inner subsection of the radially inner section the inclination of the stacking axis decreases from radially outwardly to radially inwardly in such a way that in the region of a radially inner blade tip, which is situated at a distance from a hub of a rotor of the turbomachine by a running clearance, the stacking axis extends essentially in the radial direction. The deflection behavior in the proximity of the hub of the rotor base body is thus improved, so that losses may be reduced, even for relatively large running clearances.

BRIEF DESCRIPTION OF THE DRAWINGS

Preferred refinements of the present invention result from the subclaims and the following description. Exemplary embodiments of the present invention are explained in greater detail with reference to the drawing, without being limited to same.

FIG. 1 shows a schematic illustration of a guide blade of a turbomachine according to the present invention.

DETAILED DESCRIPTION

The present invention relates to a guide blade of a turbomachine, in particular a compressor of a gas turbine, such as a gas turbine in an aircraft engine. Such a guide blade is a stator-side blade of the turbomachine.

FIG. 1 shows a highly schematic illustration of a blade 10 of a stator-side guide blade 11 of a turbomachine according to the present invention, blade 10 being defined by a flow inlet edge 12, a flow outlet edge 13, a suction side 14, and a pressure side 15.

Suction side 14 as well as pressure side 15 extend in the axial direction of guide blade 11, viewed between flow inlet edge 12 and flow outlet edge 13.

Blade 10 of guide blade 11 has a defined length in radial direction 16.

Radially outwardly at 100% of the radial length of blade 10, guide blade 11 adjoins a stator-side housing, and is preferably fastened in the housing via a blade root, likewise not shown.

Radially inwardly at 0% of the radial length of blade 10 of guide blade 11, the guide blade adjoins a hub 17 of a rotor base body, blade 10 of guide blade 11 without an inner shroud being formed, so that a running clearance 19 is formed directly between a radially inner blade tip 18 of blade 10 of guide blade 11 and hub 17 of the rotor base body.

Stator-side guide blade 11, namely, blade 10 thereof, is formed by a plurality of blade sections stacked one on top of the other in the radial direction, the centers of gravity of the blade sections extending along a stacking axis.

According to the present invention, the blade sections are stacked one on top of the other in the radial direction in such a way that in a radially inner section 22 of blade 11 adjacent to a radially outer section 20 of blade 10, the stacking axis has its single inflection point in its radial curvature, namely, between a first, radially inner subsection 24 of radially inner section 22 in which the stacking axis is curved toward pressure side 15 of guide blade 10 or of blade 11, and a second, radially outer subsection 23 of radially inner section 22 in which the stacking axis is curved toward suction side 14 of guide blade 10 or of blade 11. In first, radially inner subsection 24 of radially inner section 22, the stacking axis thus has a first radial curvature, namely, in the direction of pressure side 15 of blade 10, namely, concave toward pressure side 15. In second, radially outer subsection 23 of radially inner section 22, the stacking axis thus has a second radial curvature in the opposite direction of the first radial curvature, namely, in the direction of suction side 14, namely, concave toward suction side 14.

A single inflection point is formed between the first radial curvature of the stacking axis in first, radially inner subsection 24 of radially inner section 22 and the second radial curvature of the stacking axis in second, radially outer subsection 23 of radially inner section 22, in which the first radial curvature merges into the second, oppositely curved radial curvature.

An S-shaped contouring of the stacking axis of blade 10 of the guide blade according to the present invention is thus brought about in radially inner section 22, this S-shaped contouring being visible in FIG. 1 for flow inlet edge 12.

According to one advantageous refinement of the present invention, the stacking axis extends essentially in the radial direction in radially outer section 20 of blade 10, the blade then having essentially no curvature. This is the case in the exemplary embodiment in FIG. 1, in which the radial direction of flow inlet edge 12 in radially outer section 20 of the blade is depicted by dashed line 21.

In contrast, however, it is also possible that the stacking axis is also curved in outer section 20 of blade 10, namely, the same as in second, radially outer subsection 23 of radially inner section 22, in the direction of suction side 14, in particular with a concave curvature toward suction side 14.

In first, radially inner subsection 24 of radially inner section 22, the inclination of the stacking axis preferably decreases from radially outwardly to radially inwardly in such a way that in the region of a radially inner blade tip, which is situated at a distance from hub 17 of the rotor of the turbomachine by a running clearance 19, the stacking axis extends essentially in the radial direction, this radial direction in the region of blade tip 18 for flow inlet edge 12 being depicted by a dashed line 25 in FIG. 1.

The single inflection point of the stacking axis, which is formed between first, radially inner subsection 24 of radially inner section 22 and second, radially outer subsection 23 of radially inner section 22, is preferably situated between approximately 15% and approximately 40% of the radial length of blade 10, viewed from radially inwardly to radially outwardly.

First, radially inner subsection 24 of radially inner section 22 extends between approximately 0% and approximately 40% of the radial length of blade 10, viewed from radially inwardly to radially outwardly, and second, radially outer subsection 23 of radially inner section 22 extends between approximately 15% and approximately 60% of the radial length of blade 10, viewed from radially inwardly to radially outwardly. Radially outer section 20 of blade 10, in which the stacking axis may in particular be uncurved, extends between approximately 40% and approximately 100% of the radial length of the blade, viewed from radially inwardly to radially outwardly. If the stacking axis is also curved in radially outer section 20 of blade 10, radially outer section 20 represents an extension of second, radially outer subsection 23 of radially inner section 22.

As previously stated, blade 10 of the guide blade according to the present invention is designed as a blade without an inner shroud.

Due to the above-described curvature of the stacking axis of blade 10 in the region of second, radially outer subsection 23 of radially inner section 22, flow lines in the direction of hub 17 of the rotor are compressed, thus improving the aerodynamics in the proximity of the hub.

Due to the above-described curvature of the stacking axis in the region of first, radially inner subsection 24 of radially inner section 22, the blade region immediately adjoining running clearance 19 is additionally relieved of load, so that the stator losses may be reduced.

The deflection behavior in the proximity of hub 17 is improved as a result of the special contouring of the stacking axis in the region of blade tip 18, which at that location extends essentially in the radial direction, so that losses may be reduced, even for relatively large running clearances 19.

The invention claimed is:

1. A guide blade of a compressor comprising:
a blade without an inner shroud and having a flow inlet edge, a flow outlet edge, a suction side, and a pressure side, the blade being formed by a plurality of blade sections stacked one on top of the other in a radial direction, centers of gravity of the blade sections extending along a stacking axis,
the blade sections being stacked one on top of the other in the radial direction in such a way that, in a radially inner section of the blade adjacent to a radially outer section of the blade, the stacking axis has a single inflection point in a radial curvature, the single inflection point being between a first, radially inner subsection of the radially inner section and a second, radially outer subsection of the radially inner section,
the stacking axis in the first, radially inner subsection having a concave curvature toward the pressure side and the stacking axis in the second, radially outer subsection having a concave curvature toward the suction side;
in the first, radially inner subsection, an inclination of the stacking axis decreasing from radially outwardly to radially inwardly in such a way that in a region of a radially inner blade tip, situated at a distance from a hub of a rotor of the turbomachine by a running clearance, the stacking axis extends essentially in the radial direction;
the single inflection point of the stacking axis in a radial curvature formed between the first, radially inner subsection and the second, radially outer subsection being situated between approximately 15% and approximately 40% of the radial length of the blade, viewed from radially inwardly to radially outwardly; and
the stacking axis having a concave curvature toward the suction side in the radially outer section, so that the radially outer section forms or represents an extension of the second, radially outer subsection.

2. The guide blade as recited in claim 1 wherein the first, radially inner subsection extends between approximately 0% and approximately 40% of the radial length of the blade, viewed from radially inwardly to radially outwardly.

3. The guide blade as recited in claim 1 wherein the second, radially outer subsection extends between approximately 15% and approximately 60% of the radial length of the blade, viewed from radially inwardly to radially outwardly.

4. The guide blade as recited in claim 1 wherein the radially outer section extends between approximately 40% and approximately 100% of the radial length of the blade, viewed from radially inwardly to radially outwardly.

* * * * *